(12) United States Patent
Ferriot et al.

(10) Patent No.: US 11,298,857 B1
(45) Date of Patent: Apr. 12, 2022

(54) METHOD OF MAKING BUILDING PANELS HAVING SIMULATED WOOD GRAIN

(71) Applicant: FERRIOT INC., Akron, OH (US)

(72) Inventors: Craig C. Ferriot, Hudson, OH (US); Dale H. Leopold, Canton, OH (US)

(73) Assignee: Ferriot Inc., Akron, OH (US)

( * ) Notice: Subject to any disclaimer, the term of this patent is extended or adjusted under 35 U.S.C. 154(b) by 92 days.

(21) Appl. No.: 16/740,012

(22) Filed: Jan. 10, 2020

Related U.S. Application Data

(60) Provisional application No. 62/790,817, filed on Jan. 10, 2019.

(51) Int. Cl.
*B29C 45/00* (2006.01)
*B44F 9/02* (2006.01)
*B29L 31/10* (2006.01)
*B29C 45/14* (2006.01)

(52) U.S. Cl.
CPC ...... *B29C 45/0046* (2013.01); *B29C 45/0001* (2013.01); *B44F 9/02* (2013.01); *B29C 2045/14155* (2013.01); *B29L 2031/10* (2013.01)

(58) Field of Classification Search
None
See application file for complete search history.

(56) References Cited

U.S. PATENT DOCUMENTS

| | | | | |
|---|---|---|---|---|
| 4,743,420 A * | 5/1988 | Dutt | ................... | B29C 45/0046 264/102 |
| 5,837,175 A * | 11/1998 | Mukai | ...................... | B44F 9/04 264/73 |
| 6,306,321 B1 * | 10/2001 | Mukai | ...................... | B44F 9/02 264/73 |
| 7,507,464 B2 | 3/2009 | Walrath | | |
| 9,145,690 B2 | 9/2015 | Stucky et al. | | |
| 9,303,410 B2 | 4/2016 | Steffes et al. | | |
| 9,884,443 B2 | 2/2018 | Steffes et al. | | |
| 2005/0003221 A1 | 1/2005 | Walrath | | |
| 2005/0127345 A1 | 6/2005 | Giacchino | | |
| 2007/0063393 A1 * | 3/2007 | Vernin | .................. | B29C 70/443 264/511 |
| 2007/0182069 A1 * | 8/2007 | Becker | ..................... | C08J 3/201 264/439 |
| 2009/0114339 A1 * | 5/2009 | Jacobsen | ............... | B29C 70/443 156/285 |
| 2012/0313281 A1 * | 12/2012 | Aravamudan | .......... | B29C 70/48 264/73 |
| 2013/0328236 A1 * | 12/2013 | Yamamoto | .......... | B29C 45/0005 264/257 |
| 2014/0272273 A1 | 9/2014 | Shaw et al. | | |
| 2018/0112416 A1 | 4/2018 | Steffes et al. | | |
| 2018/0187421 A1 | 7/2018 | Schultz et al. | | |

FOREIGN PATENT DOCUMENTS

| | | | |
|---|---|---|---|
| CN | 101961883 | * | 2/2011 |
| JP | 2007001170 | * | 1/2007 |

* cited by examiner

*Primary Examiner* — Edmund H Lee
(74) *Attorney, Agent, or Firm* — Vorys, Sater, Seymour and Pease LLP; William E. Ryan

(57) ABSTRACT

Building panels and methods of making the same are disclosed herein. In one embodiment, a method of injection molding a building panel includes co-mingling a first material and a second material in a molten material, where the second material includes a color that contrasts with the first material. The method also includes injecting the molten material into a cavity of an injection mold, modifying a flow front of the molten material as the molten material flows in the cavity, and cooling the molten material to form a solidified building panel.

21 Claims, 8 Drawing Sheets

METHOD OF MAKING BUILDING PANELS HAVING SIMULATED WOOD GRAIN

CROSS-REFERENCE TO RELATED APPLICATIONS

This application claims priority to and the benefit of U.S. Provisional Application No. 62/790,817 filed Jan. 10, 2019, which is incorporated by reference herein in its entirety.

TECHNICAL FIELD

The present disclosure is directed to building panels and, in particular, to building panels having as simulated wood grain appearance.

BACKGROUND

Buildings may conventionally include polymeric siding panels and/or roofing tiles that are affixed to the sides or roofs of buildings, and protect the underlying building structure from environmental damage. Conventional building products may have a variety of profiles and surface finishes to provide a variety of aesthetic appearances to the building.

It is conventionally known to produce polymeric siding panels as an extruded sheet. The polymeric siding panel may include a generally uniform pigmentation throughout the thickness of the siding panel. An aesthetic finish may be applied to the polymeric siding panel to change the color or appearance of texture of the siding panel. In particular, color or texture may be applied such that the siding panel better reflects natural wood.

It is also conventionally known to produce siding products in an injection molding process. The injection molding process allows for the siding product to be produced with a variegated surface on the exterior-facing surfaces of the siding product without the need for a subsequent manufacturing operation. However, previous attempts to introduce variation in color to enhance the texture variegation have proven unsatisfactory, as the color variation has not been aligned well enough to act as a high-quality facsimile of grain in natural wood.

Accordingly, building panels having simulated wood grain and methods of making the same that produce siding having color and texture that more closely match the color and texture of natural wood may be desired.

SUMMARY

In one embodiment, a method of injection molding a building panel includes co-mingling a first material and a second material in a molten material, where the second material includes a color that contrasts with the first material. The method also includes injecting the molten material into a cavity of an injection mold with pressure, modifying a flow front of the molten material as the molten material flows in the cavity, and cooling the molten material to form a solidified building panel. In examples, the method includes injecting a first material, a second material, and a third material, where the first material is base material of first color, the second material includes a colorant of contrasting color, and the third material includes a second contrasting color to create streaks such as a streaker colorant.

In another embodiment, a building panel includes an exposed exterior facing portion having a simulated wood grain including a plurality of peaks and valleys that are proximate to one another and a plurality of color variation including streaks of lighter color portion and darker color portion. Each of the color variations may be transverse to a set of adjacent peaks and valleys.

In yet another embodiment, a building panel includes an exposed exterior facing portion having a plurality of color variations comprising streaks of lighter color portion and darker color portion. Each of the color variations are oriented such that at least some of the streaks of lighter color portion and the darker color portion extend along the exposed exterior facing portion of the building panel to visually simulate natural wood.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
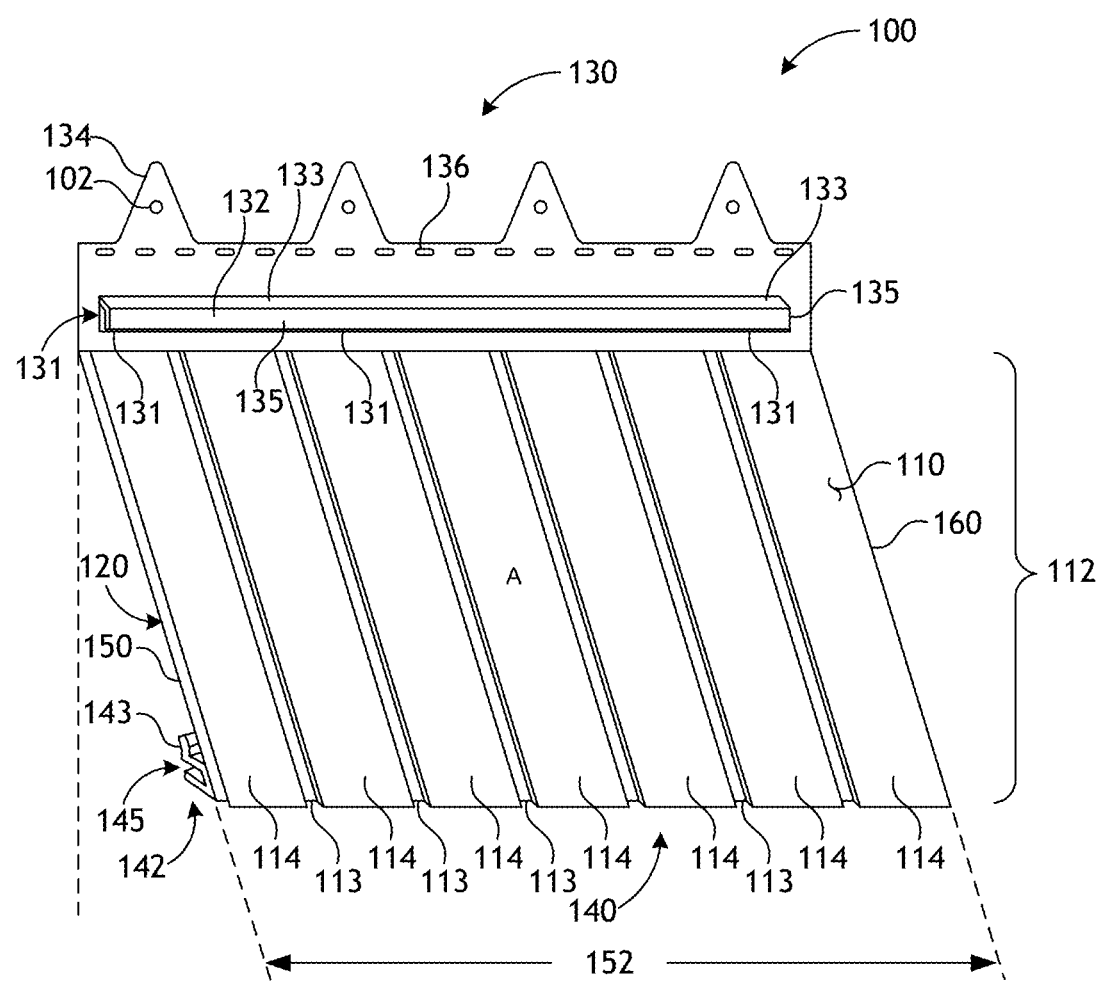
FIG. 1 depicts a side perspective view of a building panel according to one or more embodiments shown or described herein.

Reference will now be made in detail to embodiments of building panels having simulated wood grain and methods of making the same. Various embodiments of building panels having simulated wood grain and methods of making the same will be described in more detail herein.

Building panels according to the present disclosure may include panels having a simulated shingle or shake tile portion. The simulated shingle or shake tile portion may include a generally linear texture along the exterior-facing surface. The simulated shingle or shake tile portion includes a color variation that exhibits substantial linearity along the exterior-facing surface of the simulated shingle or shake tile portion. In some embodiments, the color variation has minimal angularity relative to the generally linear texture of the exterior-facing surface, such that the color variation and the generally linear texture reinforce one another in creating a visual perception that the building panel replicates natural wood.

Natural wood is viewed by consumers as a premium product within the building materials market. However, the cost of natural wood and the maintenance required to preserve long life of natural wood may be cost prohibitive for some consumers. The present disclosure is directed to a building product that provides a reasonable facsimile of natural wood building products, but is made of a material that is lower maintenance than natural wood and may have a lower material price and lower costs of installation as compared to natural wood.

Conventionally known products that are similar to embodiments of the present disclosure introduce multi-material mixtures to an injection molding process. At least two of the materials in the multi-material mixture exhibit color variation from one another, which may continue to be exhibited in the final product. However, because of limitations of the injection molding process, variations in color in the final product do not exhibit the same linearity that is produced in the simulated wood grain of the final product, and the final products do not, therefore, represent a reasonable facsimile of natural wood.

The present disclosure is directed to building panels having simulated wood grain and methods of making the same in which the simulated wood grain is substantially aligned along a length of the building panel. Methods according to the present disclosure modify the injection molding process to modify the flow of molten material in an injection mold. Because the molten material flows at a modified rate in the injection mold, the molten material may be controlled to flow in a more linear manner than conventional injection molding processes. When molten materials having multiple colors are introduced to the injection mold of the present disclosure, the more linear flow of the molten material provides more linearity to the variation in color as compared to conventional injection molding techniques. Because there is more linearity in the variation in color, there are fewer locations on the exterior surface of the building product in which the simulated wood grain crosses with the variation in color. Accordingly, building panels according to the present embodiment provide a good visual facsimile of natural wood products.

As used herein, directions such as "forward", "rearward", "above", "below", "upper", "lower", "upward", "downward", and the like refer to orientation of elements when the building panel 100 is installed on a generally vertical building structure. Accordingly, the orientation of installation or the orientation of evaluation should not affect the scope of the disclosure as it relates to embodiments of the present disclosure.

Referring now to FIG. 1, one embodiment of a building panel 100 is depicted. In this embodiment, the building panel 100 includes a front 110, a back 120, a top 130, and a bottom 140, and two opposing sides 150, 160. The building panel 100 may include an exposed exterior facing portion 112 that is positioned along the front 110 of the building panel 100. When a plurality of building panels 100 are attached to a building structure, the exposed exterior facing portion 112 is visible, while other portions of the building panel 100 are positioned away from view.

The building panel 100 may include additional elements that allow for improved manufacturing and/or installation of the building panel 100 on an underlying building structure. The building panel 100 may include a top lock 132 that is positioned proximate to the top 130 of the building panel 100 and that extends in a generally upward direction towards the exposed exterior facing portion 112. The top lock 132 may comprise a female receptacle. In some examples, the top lock 132 is arranged over one or more recesses or opening, such as an opening 131. In some embodiments, the building panel 100 may include a single top lock 132 that extends along a substantial portion of the width 152 of the building panel 100, from side 150 to side 160. In other embodiments, the building panel may include a plurality of top locks that extend in an interrupted manner across the width of the building panel (not shown). In the illustrated example, the top lock 132 includes a top portion 133 protruding outward from the front 110 and a lip portion 134 extending from an end of the top portion in a downward direction towards the bottom 140 so as to fully or at least partially cover the opening 131. In this manner, top lock 132 is configured to define a female receptacle to engage, receive, lock, or hook onto a mating male lock member as described below.

Embodiments of the building panel 100 may include a bottom lock 142 that extends rearward from the exposed exterior facing portion 112. The bottom lock 142 may define a male extension 143. When subsequent "courses" of building panels 100 are installed on a building structure, the bottom lock 142 of the "upper course" may be positioned at least partially within the top lock 132 of the "lower course", such that the bottom lock 142 and the top lock 132 of the subsequent courses engages the upper course with the lower course. For example, the male extension 143 of the bottom lock 142 may slide into or engage the female receptacle defined by the top lock 132, to thereby lock a bottom 140 of a first building panel 100 to the top 130 of a second building panel 100. In some examples, the bottom lock 142 further defines a slot 145 configured to receive a mating lip arranged at a side (e.g., side 160) of a neighboring second building panel arranged on one opposing side 160 of the building panel 100, to help interlock rows of building panels 100 at their opposing sides 150,160. In the illustrated example, the bottom lock 142 is shown extending from an interior facing portion that is opposite the exterior facing portion 112 at a location proximate to the bottom 140 edge of the building panel 100, but in other examples, the bottom lock 142 may extend from the interior facing portion at a location positioned upward from the bottom 140 edge of the building panel 100 which may provide further variability when interlocking "courses" of building panels 100 over each other.

Embodiments of the building panel 100 may also include a plurality of gate tabs 134. The gate tabs 134 may extend in a generally upward direction away from the exposed exterior facing portion 112. The building panel 100 may also include a nail hem 136 that extends in a generally lateral direction across the building panel 100. An installer may attach the building panel 100 to the underlying building structure with a variety of conventionally known fasteners, for example ring head nails and the like, that extend through the nail hem 136. The gate tabs 134 and the nail hem 136 are positioned to be covered by a subsequent course of building panel 100.

In various embodiments, the building panel 100 may include gates 102 that are generally positioned above the exposed exterior facing portion 112 of the front 110. The gates 102 may be positioned above the top lock 132 and may be positioned proximate to the gate tabs 134. The gates 102 allow for material of the building panel 100 to flow in a general direction from the top 130 towards the bottom 140.

When a building panel is made according to conventional manufacturing processes, the incorporation of the top lock 132 (see FIG. 1) may prevent the molten material from flowing in a linear manner from the gate tabs 134 towards the bottom 140 of the building panel 100. Instead, in conventional manufacturing processes, a linear flow of molten material is interrupted by the top lock 132, and molten material that flows past the top lock 132 and towards the exposed exterior facing portion 112 of the building panel 100 flows in a lateral direction that is transverse to a linear direction from the top 130 to the bottom 140 of the building panel 100.

Embodiments of the present disclosure may include a plurality of shingle portions 114 that are within the exposed exterior facing portion 112. The exposed exterior facing portions 112 and, in embodiments that include shingle portions 114, the shingle portions 114 may be sized to reflect conventional sized natural wood building materials. In the depicted embodiment, the building panel 100 includes seven (7) shingle portions 114, however any variation in the quantity and size of exposed exterior facing portions 112 and the shingle portions 114 is envisioned without departing from the scope of the present disclosure. In the illustrated example, the exterior facing portion 112 is configured to mimic the appearance of several shingles, and thus includes seams 113 arranged between the shingle portions 114 so as to provide the exposed exterior facing portions 112 of each shingle portion 114 with an appearance resembling a shingle. Here, the seams 113 are recessed into the top surface 110 so that the shingle portions are raised and protrude outward relative to the seams 113 and the seams 113 appear as gaps that would exist between neighboring shingles.

Figure 2:
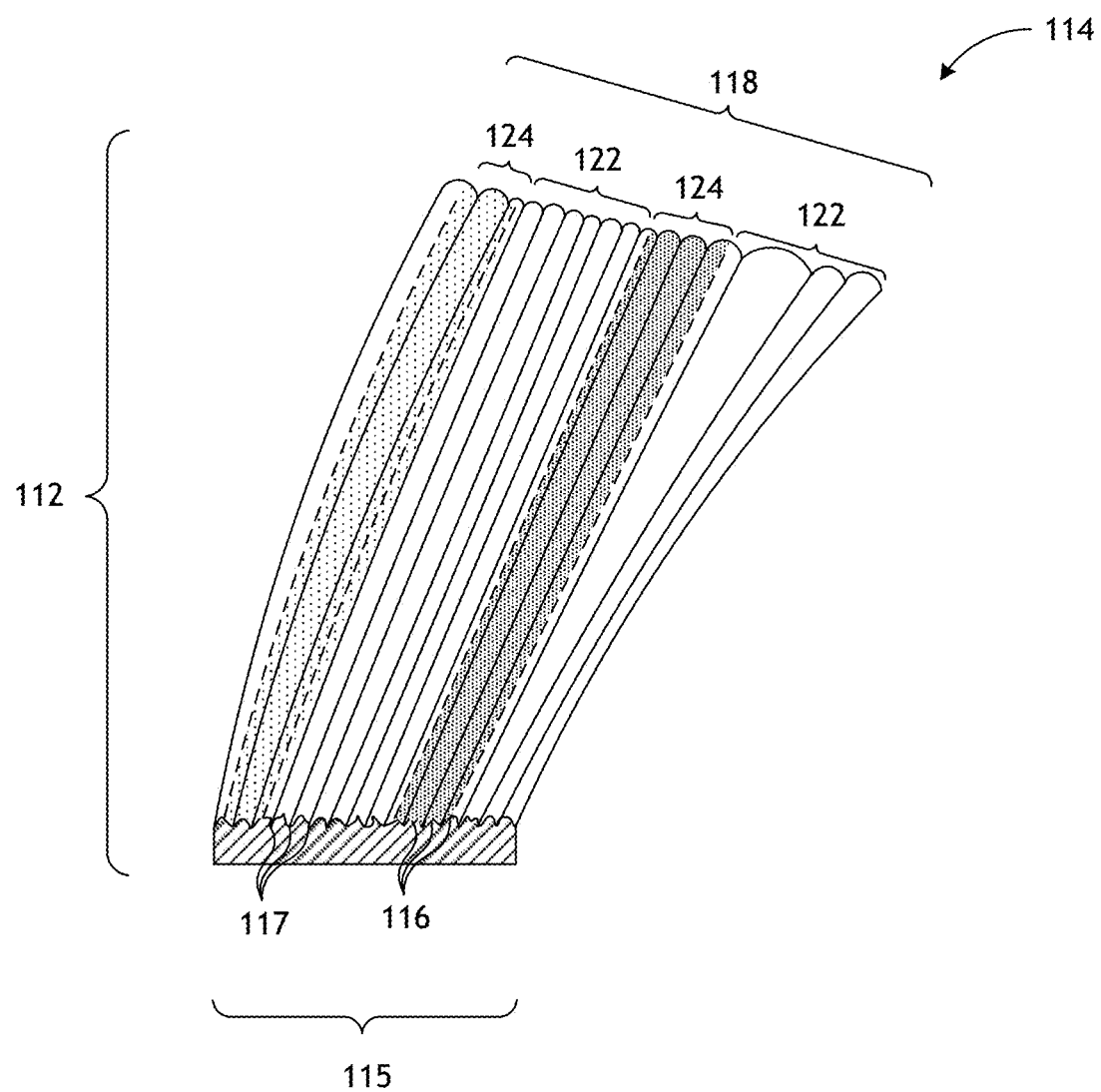
FIG. 2 depicts a detailed side perspective view of a building panel shown at location "A" on FIG. 1.

Referring now to FIG. 2, a detailed view of one of the shingle portions 114 is depicted, according to one or more examples of the present disclosure. In the depicted embodiment, the shingle portion 114 includes a simulated wood grain 115. The simulated wood grain 115 may create light and dark regions on the shingle portion 114 when viewed from a distance, such that the simulated wood grain 115 replicates the coloring and grain of a natural wood product. The simulated wood grain 115 may extend along substantially all of the exposed exterior facing portion 112. The simulated wood grain 115 includes peaks 116 and valleys 117 that extend along the exposed exterior facing portion 112, and the peaks 116 and the valleys 117 together define the simulated wood grain 115 having the appearance of natural wood. In particular, the peaks 116 and the valleys 117 simulate wood grains. The peaks 116 and the valleys 117 generally extend along the exposed exterior facing portions 112 in a generally vertical direction. In some embodiments, the peaks 116 and the valleys 117 generally do not intersect one another. In some embodiments, the peaks 116 and the valleys 117 are not linear across the exposed exterior facing portion 112. In some embodiments, the peaks 116 and the valleys 117 are not parallel with one another across the exposed exterior facing portion 112. Accordingly, the peaks 116 and valleys 117 defining the wood grain 115 may vary depending on the type of wood to be simulated and/or the finishing or weathering desired to be simulated on a particular type of simulated wood and the simulated wood grain. For example, one or more of the peaks 116 and/or valleys 117 may be shorter than its neighboring ones, and/or one or more of the peaks 116 and/or valleys 117 may merge into neighboring peaks and valleys to simulate wood grains.

Still referring to FIG. 2, the shingle portion 114 includes a color variation 118. As will be described in greater detail below, the color variation 118 is defined by streaks of a lighter color portion 122 and a darker color portion 124 that are positioned proximate to one another. The color variation 118 in embodiments according to the present disclosure may replicate the color variation of a natural wood product. The darker color portions 124 in the color variation 118 may be of the same darker shade or may be of one or more different darker shades. Similarly, the lighter color portions 122 in the color variation 118 may be of the same lighter shade or may be of one or more different lighter shades. In one embodiment, the color variation 118 may be substantially linear across the exposed exterior facing portion 112. In one embodiment, the color variation 118 may be substantially aligned with the simulated wood grain 115 defined by the peaks 116 and the valleys 117 on the exposed exterior facing portion 112. In one embodiment, the color variation 118 may be transverse to less than twenty (20) sets of adjacent peaks 116 and valleys 117. In one embodiment, the color variation 118 may be transverse to less than fifteen (15) sets of adjacent peaks 116 and valleys 117. In one embodiment, the color variation 118 may be transverse to less than ten (10) sets of adjacent peaks 116 and valleys 117. In one embodiment, the color variation 118 may be transverse to less than five (5) sets of adjacent peaks 116 and valleys 117. In various embodiments, the color variation 118 may be transverse to the simulated wood grain 115 at positions outside of the exposed exterior facing portion 112. However, the peaks 116 and valleys 117 simulate the grain lines of natural wood and the color variation 118 may transverse more than fifteen (15) or twenty (20) sets of adjacent peaks 116 and valleys 117. As will be appreciated, the color variation 118 may transverse various numbers of sets of adjacent peaks 116 and valleys 117 as will be needed to simulate the coloration of a particular type of wood to be simulated.

In some embodiments, the color variation 118 may be in a generally parallel orientation relative to the peaks 116 and valleys 117 of the simulated wood grain 115. In one embodiment, the color variation 118 may be oriented such that none of the streaks of the lighter lighter color portion 122 or the darker color portion 124 is vertically misaligned more than fifteen (15) times the thickness of the narrower of the lighter color portion 122 or the darker color portion 124, as evaluated at the overlapping peaks 116 and valleys 117 at the bottom 140 of the exposed exterior facing portion 112. In one embodiment, the color variation 118 may be oriented such that none of the streaks of the lighter color portion 122 or the darker color portion 124 is vertically misaligned more than ten (10) times the thickness of the narrower of the lighter color portion 122 or the darker color portion 124, when evaluated from the bottom 140 of the exposed exterior facing portion 112. In one embodiment, the color variation 118 may be oriented such that none of the streaks of the lighter color portion 122 or the darker color portion 124 is vertically misaligned more than five (5) times the thickness of the narrower of the lighter color portion 122 or the darker color portion 124, when evaluated from the bottom 140 of the exposed exterior facing portion 112.

In some embodiments, the color variation 118 may extend in a generally continuous orientation along the exposed exterior facing portion 112 of the building panel 100 such that a substantial portion of the streaks of the lighter color portions 122 and the darker color portions 124 extend along the exposed exterior facing portion 112, for example, at least 25% of the streaks of the lighter color portions 122 and the darker color portions 124 extend along the exposed exterior facing portion 112, for example, at least 50% of the streaks of the lighter color portions 122 and the darker color portions 124 extend along the exposed exterior facing portion 112, for example, at least 75% of the streaks of the lighter color portions 122 and the darker color portions 124 extend along the exposed exterior facing portion 112, for example, at least 85% of the streaks of the lighter color portions 122 and the darker color portions 124 extend along the exposed exterior facing portion 112, for example, a requisite percent of the streaks of the lighter color portions 122 and the darker color portions 124 extend along the exposed exterior facing portion 112 as needed to simulate the appearance of a desired type of wood. Thus, the percent of streaks extending along the exposed exterior facing portion 112 may depend on the type of the wood to be ultimately simulated and/or whether such desired type of wood is to have any simulated finishing and/or weathering. In such embodiments, the resulting building panel 100 may exhibit few visual indications of recirculation of molten material in the exposed exterior facing portion 112.

The simulated wood grain 115 and the color variation 118 of the shingle portion 114 of the building panel 100 may thus be arranged so as to provide the building panel with the visual appearance of natural wood. For example, the simulated wood grain 115 and/or the color variation 118 may be designed and formed in the building panel 100 to impart an appearance of a northern white-cedar, western red-cedar, etc., and various other types of natural woods whose natural wood appearance may be desirable to impart on a building's siding. Also, the simulated wood grain 115 and/or the color variation 118 may be designed and formed in the building panel 100 to impart a weathered or aged appearance, such that the simulated wood appearance is made to look older or weathered. For example, the simulated wood grain 115 and/or the color variation 118 may be designed and formed on the building panel 100 to impart an appearance of an aged northern white-cedar, an aged western red-cedar, a weathered northern white-cedar, a weathered western red-cedar, etc., and various other conditions or of the wood having an appearance that may be desirable to impart on a building's siding.

Figure 3:
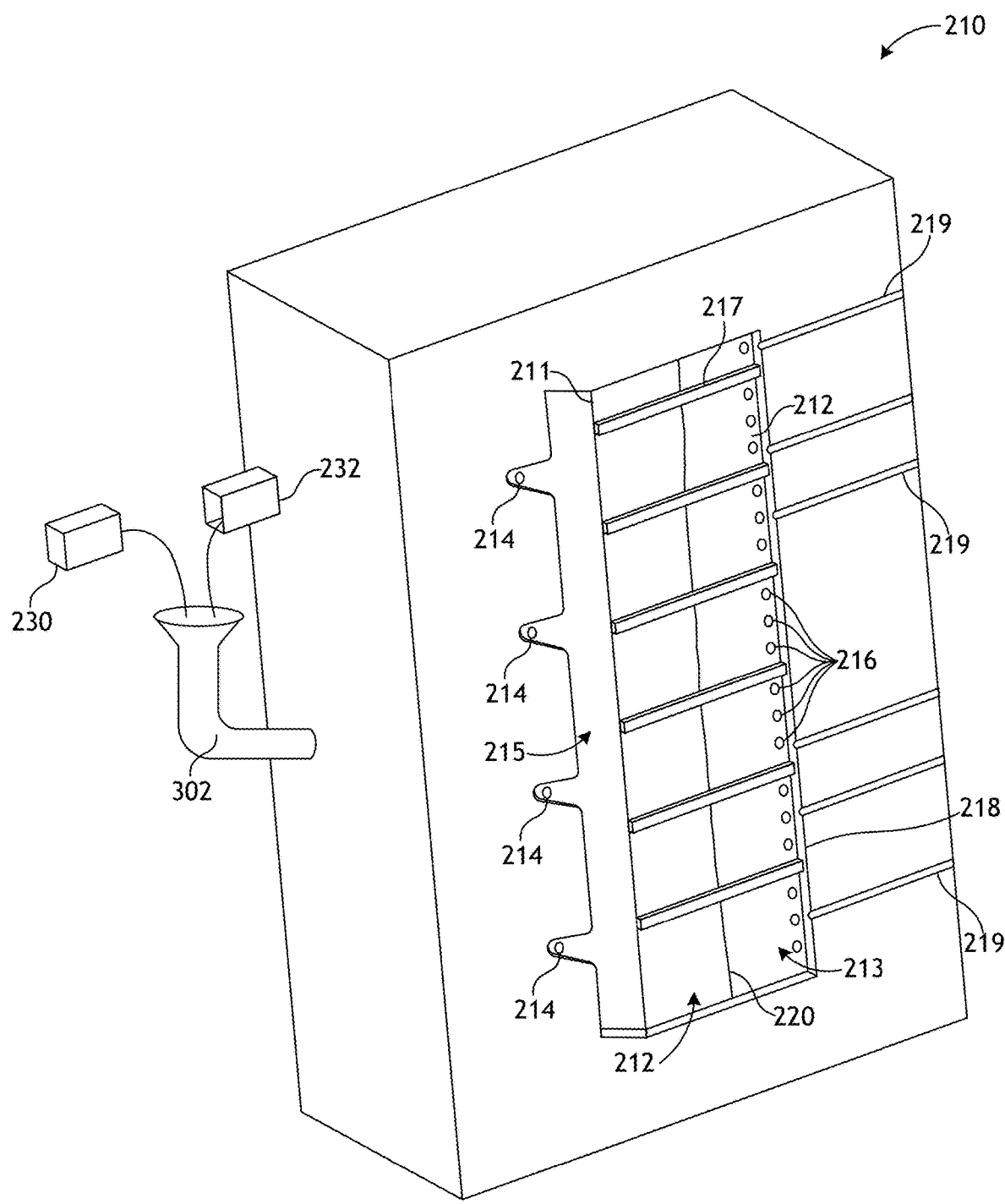
FIG. 3 depicts a schematic side perspective view of a portion of an injection mold for producing a building panel according to one or more embodiments shown or described herein.

Referring now to FIG. 3, a schematic representation of one embodiment of an injection molding process used to create building panels is depicted. In the depicted embodiment, an injection mold 210 includes a cavity 212. The cavity 212 may generally be in the shape of the finished building panel, for example, the cavity 212 may be shaped according to the geometry of the building panel 100 exemplified in FIG. 1. The cavity 212 may include various textures in regions corresponding to the exposed exterior facing portion 112 of the building panel to form the simulated wood grain. The injection mold 210 may include a plurality of gate openings 214 through which molten material is introduced to the cavity 212 while under pressure. In the illustrated example, the cavity 212 includes a first cavity section 213 shaped to form the shingle portions 114 of the building panel 100 and a second cavity section 215 shaped to form the upper skirt of the building panel 100 from which the exposed face portion 112 flares outward therefrom, and the first and second cavity sections 213,215 are divided by a line 211. Also, ribs 217 may be provided in the cavity 212, for example, in the first cavity section 213 thereof, to form the seams 113 between the shingle portions 114. The ribs 217 may extend from an edge 218 of the cavity 212 (that corresponds with the bottom 140 of the building panel 100) to the line 211, or may extend from the edge 218 to a position in the cavity 212 beyond the line 211 into the second cavity section 215, or may extend to a location within the first cavity section 213 that is short of (i.e., the ribs 217 terminate before) the line 211. In addition, texture may be provided on a surface of the cavity 212 to impart a wood grain appearance on the finished product, for example, a wood grain texture may be provided on a bottom surface of the first cavity section 213 such that cavity 212 includes a region of simulated wood grain.

At least two materials 230, 232 may be introduced to the cavity 212. The materials may be co-mingled with one another prior to entering the injection mold 210. Here, the materials 230, 232 are illustrated as being input into the injection mold 210 via a single input 302; however, the mold may have one or more additional inputs through which one or more materials may be introduced in a mixed or unmixed state. In some embodiments, the multiple materials may be purposefully unmixed or undermixed with one another when the materials are introduced to the injection mold 210. At least two materials may exhibit differing colors from one another, such that the colors of the first and second material contrast with one another. When the differing materials are introduced to the injection mold 210 and subsequently cooled, the differing materials will generally form contrasting streaks of color on the finished building panel 100.

In some embodiments, the first and second materials may be an amorphous or semi-crystalline thermoplastic, or a thermoset material. The first material may be a solid at room temperature, and the second material may be a liquid at room temperature, or both materials may be solid at room temperature. The first material may have a melting point that is less than a melting point of the second material. For example, the melting point of the first material may be about 20° F. to about 70° F. less than the melting point of the second material.

Embodiments of the first material may include a selected amount of a base resin, or a compounded material including a mixture of two or more materials. For example, the first material may comprise about 85 wt % to about 97 wt % of a base resin. The first material may comprise a base resin, and the second material may comprise a colorant that has a melting point similar to that of the base resin. The term 'colorant' may be defined as a pure pigment, a concentrate or a diluted compound.

Alternatively, the first material may comprise a base resin, and may further comprise a third material including a high melt streaker. The third material may melt at a different temperature than that of the base resin. The method and building panel may further comprise a blend of the high melt streaker and a fourth material. The fourth material may comprise a standard melt streaker. The fourth material may melt at a different temperature from the base resin and the high melt streaker. In one embodiment, the high melt streaker may have a melting temperature that is greater than the base resin, and the standard melt streaker may have a melting temperature that is greater than the base resin but lower than the high melt streaker. These materials may include similar polymer groups or different polymer groups, depending on the requirements of the particular application. Examples of the base resin may include polypropylene, polystyrene, and polyethylene. In one example, three materials are utilized, where the first material is a base resin having a base color, the second material includes colorant that of contrasting color with the base color to provide the finished product with a natural wood like color, and the third material includes a streaker colorant that at least slightly contrasts with the colorant of the second material so as to form naturally wood like streaks in the final product.

In embodiments in which multiple streakers are incorporated into the base resin, the content of the streakers may vary to provide the desired color effect. Examples of the blend may include a ratio of about 30/70 to about 70/30 (e.g., 50/50) of the high melt streaker and the standard melt streaker, respectively. Note that in certain embodiments, the components, concentration, and parameters of the polymeric material that is introduced to the injection mold to form the building panel may vary based on a variety of conditions, for example, the color of the base resin and the color of the streaker material(s). For example, the relative concentrations of the base resin and the standard melt streaker and the high melt streaker (if any) to provide the desired color effect in the resulting building panel.

Still referring to FIG. 3, in general, materials that solidify to form the building panel are introduced to the injection mold 210. In conventional injection molding processes, the flow of molten material into the injection mold 210 is governed by the pressure, velocity, and temperature of the molten material. In some embodiments according to the present disclosure, the injection mold 210 may also include active flow modifiers 216 that modify the flow of the molten material from a position inside of the injection mold 210 as the molten material fills the injection mold 210. However, in other embodiments of the present disclosure, the flow modifiers 216 need not be utilized and/or incorporated in the injection mold 210. In various embodiments, the injection mold 210 may include active flow modifiers 216 that modify the flow of the molten material, such that the molten material experiences different conditions had the molten material only been subjected to pressurization during injection. As depicted in FIG. 3, where incorporated the active flow modifiers 216 may be positioned along a side of the cavity 212 of the injection mold 210. However, the active flow modifiers 216 may, in addition or in the alternative, be positioned along the core side (not illustrated) of the injection mold 210. The core side of the injection mold 210 is not shown in FIG. 3, but is positioned opposite the cavity 212 and, when the injection mold 210 is closed, the core and the cavity 210 define the volume in which the molten polymeric material flows to form the building product. The active flow modifiers 216 may modify the direction of the flow front 220 of the molten material, such that the molten material follows a more linear path, as evaluated in a direction from the top 130 to the bottom 140 of the building product 100. The molten material, including the streaker material, is oriented according to the direction that the molten material follows in the injection mold 210. Once the molten material solidifies, the direction of travel of the streaker material will be evident. Accordingly, by using the active flow modifiers 216 to actively modify the direction of flow of the molten material in the injection mold 210, the streaker material may follow a more linear path, as evaluated in a direction from the top 130 to the bottom 140 of the building product 100.

The injection mold 210 may be subjected to vacuum pressure that is applied in various ways. In some examples, the injection mold 210 includes a vacuum area configured to affect vacuum pressure within the cavity 212 and vacuum pressure is applied via one or more vents that communicate with one or more areas of the cavity 211. For example, a plurality of vents 219 may be arranged along the edge 218 of the first cavity section 213 corresponding with the bottom 140 of the shingle portions 114, to apply vacuum pressure from the edge 218 and thereby pull the molten material toward the edge 218. The vents 219 may be in communication with a vacuum area of the injection mold 210, and the vacuum area may be configured as a channel positioned proximate to the edge 218 and interconnecting the vents 219 so that vacuum pressure is evenly applied to each of the vents 219. However, in some examples, the amount of vacuum pressure applied at each of the vents 219 may be controlled such that the vents 219 need not apply equal vacuum pressure and in such examples, the vacuum area may include a unique channel feeding each of the vents 219 and/or controllable valves may be provided to adjust vacuum pressure exerted at each or groups of the vents 219. Various numbers of vents 219 may be utilized, and in some examples, at least one vent 219 is arranged on the edge 218 at a location between neighboring pairs of the ribs 217, so that each portion of the first cavity section 213 defined between neighboring ribs 217 and corresponding with an individual one of the shingle portions 114 includes at least one of the vents 219. In some examples, the vents 219 may be provided along the edge 219 at locations thereon from which one or more of the ribs 217 extends.

Figure 4:
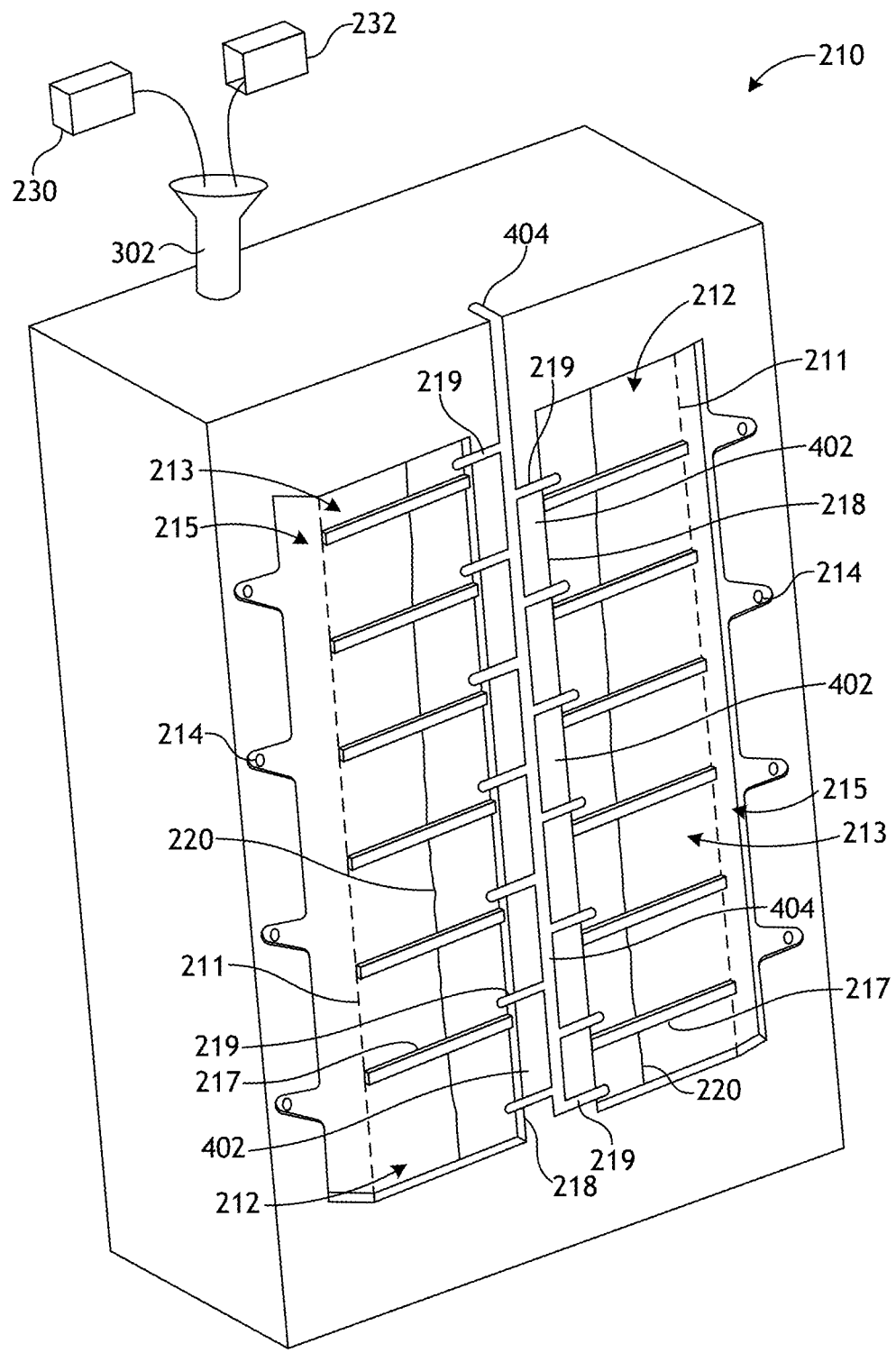
FIG. 4 depicts a schematic side perspective view of a portion of an alternate injection mold for producing at least a pair of building panel according to one or more embodiments shown or described herein.
Figure 5A:
FIGS. 5A-5D illustrate some exemplary simulated wood grain that may be imparted on building panels of the present disclosure.
Figure 5B:
Figure 5C:
Figure 5D:

FIG. 3 illustrates an example of the injection mold 210 having a single cavity 212. In other examples, however, the injection mold 210 may have two or more of the cavities 212. In one embodiment, as exemplified in FIG. 4, the injection mold 210 has a pair of cavities 212 arranged on either side of a partitioning member or parting line 402. Here, the vents 219 are arranged on the parting line 402 so as to open into the first cavity sections 213 of the respective cavities 212 at the edges 218 thereof, and the vents 219 fed and interconnected via a channel 404. Thus, in this example the parting line 402 may include a central vacuum area, and vacuum pressure may be applied through the central vacuum area between the two cavities 212, opposite their respective gate openings 214, where the central vacuum area comprises the channel 404 formed in the parting line 402 in the center of the mold 210 that feeds the vents 219. In some examples, the vacuum pressure is substantially evenly or uniformly applied along the edge 218; however, the vacuum pressure may be unevenly or non-uniformly applied along the edge 218. In other examples, vacuum pressure may be applied through the active flow modifiers 216 that are configured as vacuum ports in the injection mold 210. In some examples, vacuum pressure is applied via the flow modifiers 216 which are arranged along the line 211 and/or via flow modifiers 216 arranged as illustrated in FIG. 3. In some examples, however, the flow modifiers 216 are not be utilized as vacuum ports.

Thus, molds according to the present disclosure may incorporate vacuum technology in the form of a vacuum area from which vacuum pressure is applied to affect flow of molten material within the cavity 212. Vacuum technology may include utilization of injection molds having vents and channels as described herein. As mentioned above, the vacuum technology may be utilized to impart negative pressure (i.e., a vacuum) in the cavity, for example, at the vents. The vacuum technology may impart the same negative pressure at each of the vents, or one or more of the vents may have one or more different negative pressures. The vacuum pressure may selectively accelerate the flow of molten material in the injection mold 210, such that the molten material exhibits a modified flow front 220 as compared to conventional injection molds. At various locations throughout the injection mold 210, seals (not depicted) may be positioned to selectively allow for an interruption of air flow through the cavity 212. Through introduction of the vacuum pressure, molten material at certain locations can be "steered" through the injection mold 210. In particular, the molten material may be steered such that the flow front 220 of the molten material flows along the cavity 212 in a direction that corresponds to a direction from the top 130 to the bottom 140. In some embodiments, the molten material may be steered such that the flow front 220 of the molten material flows in a direction that is generally parallel to a texture that is formed into the cavity 212. Because of this configuration of the flow front 220 of the molten material, the color variation 118 formed by the lighter color portion 122 and the darker color portion 124 may be oriented in a generally vertical configuration when evaluated across the exposed exterior facing portion 112 (as depicted in FIG. 2), and, in some embodiments, such that the color variation 118 is generally parallel to the texture of the exposed exterior facing portion 112 as defined by the peaks 116 and the valleys 117. Because the color variation 118 closely follows the texture of the exposed exterior facing portion 112, the color variation 118 reinforces the appearance of the simulated wood grain of the building product.

In some embodiments, the vacuum pressure may be applied in a continuous and consistent manner during the injection molding process. In other embodiments, the vacuum pressure may be applied in a non-continuous manner during the injection molding process, such that the molten material is subjected to the variation in flow during portions of the injection molding process. For example, vacuum pressure may be applied on a manual or temporary basis. It should be noted that the vacuum pressure may be actively controlled during portions of the injection molding process such that the vacuum pressure may modify the flow of molten material when so desired to satisfy the conditions of the injection molding process. It should be noted that the variation in vacuum pressure may be controlled throughout the injection molding process, including by varying the intensity and duration of the application of vacuum pressure, such that the molten material may be steered through the injection mold to satisfy the requirements of the finished building panel. In some examples, the vacuum pressure may be controlled, for example, via switches and/or a programmable logic controller ("PLC"). In the case of the latter, a PLC may be utilized to trigger actuation of the vacuum system. Where utilized, the PLC may be in communication with both the press machine and the vacuum system such that switches need not be utilized. For example, there could be a tie in at the press where the PLC picks up a signal on the molding machine to actuate the vacuum system. For example, switches may be installed on the injection mold 210 to control vacuum pressure which may be applied on a manual or temporary basis. In some such examples, switches may be provided on the outside of the injection mold 210, for example, to send a signal to activate or deactivate the vacuum device that imparts vacuum pressure. In some examples, timers may be used to control operation of the vacuum device such that it applies vacuum pressure for a designated time. For example, the timer may be set to power the vacuum device for a certain amount of time and/or may be set to activate and/or deactivate the vacuum device at certain times or upon occurrence of a certain action. In some examples incorporating both timers and limit switches, the limit switch may send a signal to the vacuum device which has timers to control the vacuum a designated time after the signal is received. For example, one or more limit switches arranged at the parting line 402 may be activated when the injection mold 210 is closed, such that the limit switch(es) send a signal to the vacuum device, and timers may be set such that the vacuum device imparts vacuum pressure immediately or after a designated amount of time after closing (e.g., a few seconds). The timers may be configured such that the vacuum device may then impart vacuum pressure a designated length of time and/or until the injection mold 210 is opened. Thus, vacuum pressure may be controlled such that the vacuum may be actuated when the mold is closed and then stop after material is injected (e.g., a few seconds) or before the mold is opened. In some examples, however, both a PLC and switches are used to control vacuum pressure.

Benefits have been realized utilizing vacuum technology as herein described. For example, lower injection pressures needed to inject material into the injection mold have been experienced utilizing vacuum technology. Also, vacuum technology helps make sure there are no air/gas traps across the part which could cause local areas where there could be higher resistance to material filling the mold. This may also reduce some panel edge gloss that may build up over time as the vents get blocked with material residue, thereby extending the time period between mold cleaning. Thus, vacuum technology assists in evacuating air from the mold cavity, which is beneficial, especially on larger parts where a large volume of air in the mold cavity should be evacuated in a short period of time (e.g., a few seconds) as that is how fast the plastic is injected into the mold cavity. Additional benefits include lower tonnage and reduce cycle time.

In another embodiment, the injection mold 210 may be subjected to magnetic forces that are applied through active flow modifiers 216 that are magnets positioned in the injection mold 210. In some embodiments, the magnets may be electromagnets that are selectively controllable to introduce the magnetic force during the injection molding process. In other embodiments, the magnets may be permanent magnets. In these embodiments, some or all of the molten materials may include particles that are responsive to magnetism. The magnetic forces may selectively accelerate the flow of molten material in the injection mold 210, such that the molten material exhibits a modified flow front 220 as compared to conventional injection molds. Through introduction of the magnetic forces, molten material at certain locations can be "steered" through the injection mold 210. In particular, the molten material may be steered such that the flow front 220 of the molten material flows along the cavity 212 in a direction that corresponds to a direction from the top 130 to the bottom 140. In some embodiments, the molten material may be steered such that the flow front 220 of the molten material flows in a direction that is generally parallel to a texture that is formed into the cavity 212. Because of this configuration of the flow front 220 of the molten material, the color variation 118 formed by the lighter color portion 122 and the darker color portion 124 may be oriented in a generally vertical configuration when evaluated across the exposed exterior facing portion 112 (as depicted in FIG. 2), and, in some embodiments, such that the color variation 118 is generally parallel to the texture of the exposed exterior facing portion 112 as defined by the peaks 116 and the valleys 117. Because the color variation 118 closely follows the texture of the exposed exterior facing portion 112, the color variation 118 reinforces the appearance of the simulated wood grain of the building product. In the illustrated example, the flow modifiers 216 are shown arranged linearly proximate to the edge 218; however, in other examples, the flow modifiers 216 may be provided anywhere else within the cavity 212, and need not be in a linear arrangement as illustrated. For examples the flow modifiers 216 may be located on the second cavity section 215, proximate the line 211, and/or at various locations within the first cavity section 213, and may be organized in various linear and/or non-linear arrangements relative to each other.

In some embodiments, the magnetic forces may be applied in a continuous and consistent manner during the injection molding process. In other embodiments, the magnetic forces may be applied in a non-continuous manner during the injection molding process, such that the molten material is subjected to the variation in flow during portions of the injection molding process. It should be noted that the vacuum pressure may be actively controlled during portions of the injection molding process such that the vacuum pressure may modify the flow of molten material when so desired to satisfy the conditions of the injection molding process. It should be noted that the variation in magnetic force may be controlled throughout the injection molding process, including by varying the intensity and duration of the application of the magnetic force, such that the molten material may be steered through the injection mold to satisfy the requirements of the finished building panel. In some examples, however, magnetic forces need not be utilized.

In injection molds 210 having the cavity 212 that includes elements that vary the flow of the molten material, the molten material continues to fill the cavity 212 until full or until a pre-determined amount of molten material enters the injection mold 210. The molten material, therefore, will continue to take the shape and texture of the cavity 212, including taking the shape of the cavity 212 that forms the simulated wood grain of the exposed exterior facing portion 112.

Following introduction of the molten materials to the cavity 212 of the injection mold 210, the molten materials are allowed to cool, thereby forming the building panel 100. The now-solidified building panel 100 is removed from the injection mold 210, and may be subjected to subsequent manufacturing processes.

FIGS. 5A-5D illustrate some exemplary simulated wood grain that may be imparted on building panels of the present disclosure. These images illustrate exemplary simulated wood grains and color variations that may be formed on the shingle portion 114 according to one or more embodiments of the present disclosure. As illustrated, the peaks 116 and the valleys 117 that define the simulated wood grain 115 may be selected, designed, and/or arranged to provide the shingle portion 114 with the visual appearance of natural wood that is desired to be simulated by the building panel 100. As illustrated, the color variation 118 may be oriented to position the streaks of lighter color and the streaks of darker color as desired to simulate the coloring and visual appearance of natural wood that is desired to be simulated, and/or to simulate any artificial weathering or other conditioning that may be imparted on the building panel 100.

It should now be understood that building panels according to the present disclosure may be manufactured such that the simulated wood grain of the building panel closely reflects the color variation in the building panel, thereby providing an artificial product that closely reflects the aesthetics of a natural wood product. By controlling the flow of molten material in the cavity of an injection mold, the materials can be directed in a direction that is generally aligned with an axis from the top to the bottom of the building panel, or that is generally parallel to a texture in the building panel, such that the resulting color variation is geometrically aligned with the texture of the building panel, thereby forming a building panel that exhibits a simulated wood grain. Embodiments of the injection mold according to the present disclosure provide elements that modify the flow of the molten material to effectively steer the molten material through the cavity of the injection mold, and thereby form the building panel with the desired directionality of the color variation.

It is noted that the terms "generally" and "substantially" may be used herein to represent the inherent degree of uncertainty that may be attributed to any quantitative comparison, value, measurement, or other representation. These terms are also used herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of injection molding a building panel, comprising:
   co-mingling a first material and a second material to create a molten material, the second material comprising a color that contrasts with the first material;
   injecting the molten material into a cavity of an injection mold, wherein the cavity is divided into a first cavity section and a second cavity section, the second cavity section comprising a textured surface simulating wood grain, and wherein the injection mold comprises gate openings through which the molten material flows into the cavity, the gate openings being provided in the first cavity section;
   applying vacuum pressure within the cavity and thereby modifying a flow of the molten material from within the injection mold while the molten material flows in the injection mold; and
   cooling the molten material to form a solidified building panel.

2. The method of claim 1, wherein the injection mold comprises at least one vent configured to apply vacuum pressure to an edge of the cavity such that vacuum pressure is applied to the molten material from the edge of the cavity, thereby modifying the flow front of the molten material.

3. The method of claim 1, wherein the injection mold comprises at least one vacuum port through which vacuum pressure is applied to the molten material, thereby modifying the flow front of the molten material.

4. The method of claim 1, wherein the injection mold comprises magnets through which magnetic force is applied to the molten material, thereby modifying the flow front of the molten material.

5. The method of claim 1, wherein the cavity is a pair of cavities and the injection mold further comprises a central vacuum area in between the pair of cavities, wherein vacuum pressure is applied to the molten material through the central vacuum area, thereby modifying the flow front of the molten material.

6. The method of claim 1, wherein the step of co-mingling the first material and the second material in the molten material further includes co-mingling at least a third material having a streaker colorant.

7. The method of claim 1, wherein the first material has a melting point that is less than a melting point of the second material.

8. The method of claim 7, wherein the melting point of the first material is about 20° F. to 70° F. less than the melting point of the second material.

9. The method of claim 1, wherein the first material comprises about 85 wt. % to about 97 wt. % of a base resin.

10. The method of claim 1, wherein the first material comprises a base resin, and the step of co-mingling the first material and the second material further includes co-mingling a third material and a fourth material, wherein the third material is a high melt streaker and the fourth material is a standard melt streaker.

11. The method of claim 10, wherein the third material and the fourth material are blended in a ratio of 30:70 to 70:30.

12. The method of claim 11, wherein the ratio is 50:50.

13. The method of claim 6, wherein the third material is a low melt streaker or a high melt streaker.

14. The method of claim 1, wherein the textured surface extends into at least a portion of first cavity section.

15. The method of claim 1, wherein the ribs are formed formed on the textured surface of the second cavity section.

16. The method of claim 1, wherein a surface of the first cavity section is off-set or oriented at an angle relative to the textured surface of the second cavity section.

17. The method of claim 1, wherein the step of applying vacuum pressure comprises controlling intensity of vacuum pressure, and/or controlling duration of vacuum pressure, and/or controlling start and stop of vacuum pressure.

18. The method of claim 17, wherein vacuum is controlled via a programmable logic controller.

19. The method of claim 17, wherein vacuum is controlled via a timer.

20. The method of claim 17, wherein vacuum is controlled via a switch.

21. The method of claim 1, wherein the step of applying vacuum pressure comprises controlling intensity and/or duration of vacuum pressure.

\* \* \* \* \*